United States Patent
Uemura

(10) Patent No.: US 6,372,834 B1
(45) Date of Patent: Apr. 16, 2002

(54) STABILIZED SPANDEX

(75) Inventor: Yuji Uemura, Otsu (JP)

(73) Assignee: DuPont Toray-Co. Ltd., Tokyo (JP)

( * ) Notice: Subject to any disclaimer, the term of this patent is extended or adjusted under 35 U.S.C. 154(b) by 0 days.

(21) Appl. No.: 09/857,523

(22) PCT Filed: Dec. 15, 1999

(86) PCT No.: PCT/US99/29707

§ 371 Date: Jun. 4, 2001

§ 102(e) Date: Jun. 4, 2001

(87) PCT Pub. No.: WO00/36195

PCT Pub. Date: Jun. 22, 2000

(51) Int. Cl.$^7$ .............................. C08K 3/00; C08K 3/18
(52) U.S. Cl. ....................................... 524/424; 524/432
(58) Field of Search ................................. 524/424, 432

(56) References Cited

U.S. PATENT DOCUMENTS

| | | | |
|---|---|---|---|
| 2,999,839 A | | 9/1961 | Arvidson, Jr. et al. |
| 3,386,942 A | | 6/1968 | Bell et al. |
| 3,994,881 A | * | 11/1976 | Aitau et al. |
| 4,340,527 A | | 7/1982 | Martin |
| 4,798,880 A | * | 1/1989 | Lodoen |
| 4,824,929 A | * | 4/1989 | Arimatsu et al. |
| 4,837,292 A | * | 6/1989 | Lodoen |
| 5,086,150 A | * | 2/1992 | Frauendorf et al. |
| 5,626,960 A | | 5/1997 | Carney |
| 5,859,136 A | * | 1/1999 | Scopazzi et al. |
| 5,872,186 A | * | 2/1999 | Ang |
| 5,945,244 A | * | 8/1999 | Barbetta et al. |
| 6,010,812 A1 | * | 1/2001 | Barbetta et al. |
| 6,214,145 B1 | * | 4/2001 | Umezawa et al. |
| 6,232,374 B1 | * | 5/2001 | Liu et al. |

FOREIGN PATENT DOCUMENTS

| | | | |
|---|---|---|---|
| GB | 929257 | | 7/1961 |
| GB | 1104127 | * | 1/1977 |
| WO | WO97/09473 | | 3/1997 |

* cited by examiner

Primary Examiner—Veronica P. Hoke

(57) ABSTRACT

Spandex-type polyurethanes are protected against mechanical diagradation and yellowing which is produced by nitrogen oxide, chlorine or UV light, by incorporation of poly (N,N-diethyl-2-aminoethyl methacrylate) and either zinc oxide or an admixture of huntite and hydromagnesite.

2 Claims, No Drawings

STABILIZED SPANDEX

BACKGROUND OF THE INVENTION

1. Field of the Invention

The present invention relates to spandex containing a combination of additives and, more specifically, to spandex containing both an inorganic stabilizer and a polymeric hindered amine stabilizer.

2. Description of Background Art

A variety of additives has been used in attempts to prevent or diminish the yellowing and mechanical degradation of spandex that can result from exposure to various environmental factors. Durability and whiteness retention during laundering and use are important attributes for spandex.

U.S. Pat. No. 2,999,839 discloses the use of poly(N,N-diethyl-2-aminoethyl methacrylate), alone or in combination with specific inorganic additives, as an additive in spandex. However, this additive is not particularly effective at preventing yellowing when the spandex is exposed to the chlorine agents present in swimming pools and laundries.

Various inorganic compounds such as zinc oxide and a mixture of huntite and hydromagnesite are disclosed as spandex additives in U.S. Pat. Nos. 4,340,527 and 5,626,960, respectively. These additives offer chlorine resistance to spandex but may not be able to prevent yellowing of the spandex on exposure to nitrogen oxides or UV light.

Spandex with improved resistance to yellowing and mechanical degradation from various environmental factors is still needed.

SUMMARY OF THE INVENTION

The present invention is spandex containing a stabilizing composition of (A) 0.5–5% by weight of the spandex of poly(N,N-diethyl-2-aminoethyl methacrylate); and (B) 1.5–5% by weight of the spandex of an inorganic material selected from the group consisting of zinc oxide and a mixture of huntite and hydromagnesite.

DETAILED DESCRIPTION OF PREFERRED EMBODIMENTS

It has now been found that spandex containing both poly(N,N-diethyl-2-aminoethyl methacrylate) and a mixture of huntite and hydromagnesite has high resistance to yellowing and high mechanical resistance to chlorine.

As used herein, "spandex" means a manufactured fiber in which the fiber-forming substance is a long chain synthetic elastomer comprised of at least 85% by weight of a segmented polyurethane.

Spandex is typically prepared by either melt-spinning a polyurethane or dry- or wet-spinning a polyurethane or polyurethaneurea solution either into a column filled with a hot inert gas such as air, nitrogen or steam or into an aqueous bath to remove the solvent followed by winding up the fiber.

The polyurethane is generally made by reacting a polymeric glycol with a diisocyanate to form a capped glycol, a mixture of isocyanate-terminated glycol and unreacted diisocyanate. If a polyurethane without urea moieties is desired, the capped glycol can be reacted with a diol chain extender and optionally a monofunctional chain terminator either in the melt or after being dissolved in a solvent. If a polyurethaneurea is desired, the capped glycol can be dissolved in a solvent before being reacted with a diamine chain extender and optional monofunctional chain terminator.

Polymeric glycols used to prepare polyurethanes for spandex include polyethers such as poly(tetramethylene-ether) glycol, poly(3-methyl-1,5-pentamethyleneether) glycol, and poly(tetramethyleneether-co-2-methyltetra-methyleneether) glycol; polyesters such as the polycondensation products of diols such as ethylene glycol, 1,4-butane diol, and 2,2-dimethyl-1,3-propane diol with diacids such as adipic acid, succinic acid, dodecanedioic acid, and copolymers thereof; and polycarbonates such as poly(pentane-1,5-carbonate) diol and poly(hexane-1,6-carbonate) diol.

Useful diisocyanates include 1,1'-methylenebis(4-isocyanatobenzene) ("MDI"), 1,1'-methylenebis(4-isocyanatocyclohexane), 4-methyl-1,3-phenylene diisocyanate, 5-isocyanato-1-(isocyanatomethyl)-1,3,3-trimethylcyclohexane, 1,6-hexamethylene diisocyanate, and mixtures thereof.

Useful chain extenders for making polyurethanes include ethylene glycol, trimethylene glycol, 1,4-butanediol, neopentyl glycol, 1,2-propylene glycol, 1,4-cyclohexane dimethylol, 1,4-cyclohexane diol, 1,4-bis(2-hydroxyethoxy)benzene, bis(2-hydroxyethyl) terephthalate, paraxylylene diol, and mixtures thereof. Useful chain extenders for making polyurethaneureas (a sub-class of polyurethanes) include ethylene diamine, 1,3-cyclohexane diamine, 1,4-cyclohexane diamine, 1,3-diaminopropane, 1,2-diaminopropane, 1,3-diaminopentane, 2-methyl-1,5-pentanediamine, and mixtures thereof. Chain terminators optionally used to control molecular weight can include diethylamine, cyclohexylamine, butylamine, hexanol, and butanol.

The concentration of the polyurethane(urea) in the spinning solution is in the range of about 30–40 weight percent, based on the total weight of the solution. Suitable solvents for the spinning solution include dimethylacetamide ("DMAc"), N-methylpyrrolidone, and dimethylformamide.

The stabilizing composition can be introduced into the spandex of this invention by first preparing a slurry of the composition, and optionally other additives and/or a viscosity enhancer (for example some of the polyurethane from which the spandex is to be made), in DMAc and then mixing the slurry into the spinning solution just before spinning. Separate slurries can be used for the various additives, but it is not necessary to do so. In order to obtain a uniformly mixed slurry with very finely divided particle sizes, the slurry is mixed at high shear, for example, by milling or otherwise grinding.

The spandex of this invention contains 0.5%–5% by weight of poly(N,N-diethyl-2-aminoethyl methacrylate).

The inorganic material of the stabilizing composition can be a mixture of huntite [$(Mg_3Ca(CO_3)_4)$] and hydromagnesite (basic magnesium carbonate), generally represented as $Mg_4(CO_3)_4 \cdot Mg(OH)_2 \cdot 4H_2O$ or zinc oxide. Beneficial effects have been observed when the mixture of huntite and hydromagnesite is incorporated into the spandex in an amount of at least about 0.25% by weight. Generally, the inorganic material is present as 1.5–5% by weight, based on the weight of the spandex.

In the Examples, several tests were used. For all yellowing resistance tests, "b" values were measured with a Colormaster differential colorimeter having a Model D-29-DP-9000 signal processor (Hunter Associates Laboratory, Inc.) and the difference between "b" values before and after testing ("Δb") was reported. The samples were not scoured before testing.

To measure resistance to yellowing by chlorine, a spandex sample of about 10 grams was wound around a Teflon® sheet to prepare a sample card, which was then soaked for 30 minutes in an aqueous solution of 600 ppm chlorine (prepared with sodium hypochlorite) at a temperature of 40±2° C., followed by rinsing for 10 minutes with water and air drying at room temperature. The change in "b" value was then calculated and recorded as "delta b".

To measure resistance to yellowing by simulated sunlight, about 10 g of spandex was wound around a stainless steel sheet and irradiated in a Sunshine Weather Meter (Wel-Sun-HCH Model B, Suga Shikenki K. K., Shinjuku-Ku, Tokyo, Japan) for 40 hours at 25% elongation, 63° C., and 60% relative humidity ("RH") after which the "b" value was measured and compared with the corresponding value before irradiation to give "delta b".

To measure resistance to yellowing caused by $NO_2$, 10 grams of spandex was wound around a stainless steel sheet at low tension to form a layer of about 0.32-cm thickness and exposed for 40 hours to 7 ppm $NO_2$ gas in air at 40° C. and 60% RH in a Scott Controlled Atmosphere tester (Scott Research Laboratories, Inc.). As before, "b" values before and after testing were compared to give "delta b".

To measure the mechanical durability of spandex in the presence of chlorine, a sample of spandex was stretched 25% and soaked in the stretched condition for 96 hours in an 1 ppm aqueous chlorine solution (prepared with sodium hypochlorite) at 250° C. and pH 7.5. The spandex was rinsed and its tenacity was then measured using Instron® Models 1122 or 4500 at 21° C. and 65% RH in accordance with the general method of ASTM D 2731-72. Three filaments, a 2-inch (5-cm) gauge length and a zero-to-300% elongation cycle were used for each of the measurements. Each sample was cycled five times at a constant elongation rate of 50 centimeters per minute, and tenacity-at break ("$Tb_b$") was determined at the point at which the sample broke in a sixth cycle. Percent retention of $T_b$ of the treated samples vs. untreated samples was calculated.

Total isocyanate moiety content ("%NCO") in the capped glycol was measured by the method of S. Siggia, "Quantitative Organic Analysis via Functional Group", 3rd Edition, Wiley & Sons, New York, pp. 559–561 (1963).

EXAMPLES

Example 1

A solution of polyurethaneurea was prepared by the following conventional method. MDI and poly (tetramethyleneether) glycol (Terathane® 1800, a registered trademark of E. I. du Pont de Nemours and Company) were thoroughly mixed at a 1.58:1 molar ratio and stirred for about 3 hours at 90° C. to give a capped glycol having 2.22% NCO. A 250-g quantity of the capped glycol was diluted with 440 g of DMAc (36 wt % solids). Then 30 g DMAc, 4 g ethylene diamine chain extender and 0.2 g diethylamine chain terminator were mixed and the resulting solution was added to the capped glycol solution and very rapidly mixed at room temperature using a commercial high speed stirrer (model B200G, Tokyo Rikakikai Co., Ltd.). The resulting solution was 35 wt % in polyurethane and had a viscosity of 2000–3000 poise, measured in accordance with the general method of ASTM D1343-69 using a Model DV-8 Falling Ball Viscometer (Duratech Corp., Waynesboro, Va.), operated at 40° C.

A slurry was prepared from a mixture of huntite and hydromagnesite (50/50 weight ratio) (Ultracarb U3, having a median particle size of about 3.6 microns, manufactured by Microfine Minerals Ltd.), a condensation polymer of p-cresol and divinyl benzene (Methacrol® 2390 D, a registered trademark of E. I. du Pont de Nemours and Company), poly(N,N-diethyl-2-aminoethyl methacrylate) ("FHM", manufactured by Sanyo Kasei Kogyo KK), DMAc, and a small amount of the polyurethaneurea to be used as the spandex. The slurry was milled with glass beads using a Dyno® Mill Type KDL-special (Shimaru Enterprise Corp.) to a final median particle size of about 0.4 micron.

The slurry was thoroughly mixed into the polyurethane solution to give a spinning solution. The proportions in the slurry and the amount mixed into the polyurethane solution were such that the spinning solution contained 4 wt % of the huntite/hydromagnesite mixture, 1.5 wt % Methacrol® 2390D, and 0.58 wt % poly(N,N-diethyl-2-aminoethyl methacrylate), all based on polymer solids. The spinning solution was dry spun by conventional means to form a spandex of 4 coalesced filaments totalling 40 denier (44 decitex) . Results of tests performed on the spandex are given in the Table.

Example 2

To a polyurethane solution, prepared as in Example 1 was added a slurry as in Example 1 except that, instead of huntite/hydromagnesite, zinc oxide was utilized (Kadox-15, New Jersey Zinc Company) so that the spinning solution contained 3% by weight of zinc oxide of the polymer solids. The slurry containing ZnO was milled in a transverse mill, filled with glass beads, until the average particle size was 0.1–1 μm. The spinning solution was dry-spun as in Example 1 to afford spandex filaments as in Example 1. The results are tabulated in the Table.

Comparison Example 1

Spandex was prepared in substantially the same way as described in Example 2 but without adding any poly(N,N-diethyl-2-aminoethyl methacrylate). Test results are given in the Table.

Comparison Example 2

Spandex was prepared in substantially the same way as described in Example 1 but without adding the mixture of huntite and hydromagnesite. Test results are also given in the Table.

Comparison Example 3

Spandex was prepared in substantially the same way as described in Example 1 but without adding either the mixture of huntite and hydromagnesite or the poly(N,N-diethyl-2-aminoethyl methacrylate). Test results are also given in the the Table where "Comp." denotes a Comparison Example and "Broke" means the spandex broke during treatment or during measurement so that determination of a value was not possible.

TABLE

| Example | Resistance to Yellowing (Δb) | | | Durability against chlorine |
|---|---|---|---|---|
| | Sunlight | NO2 | Chlorine | (% retention of $T_b$) |
| 1 | 8.2 | 10.5 | 3.8 | 22 |
| 2 | 10.4 | 10.5 | 4.0 | 23 |
| Comp. 1 | 8.1 | 13.1 | 5.6 | 19 |
| Comp. 2 | 8.9 | 11.2 | 12.0 | Broke |
| Comp. 3 | 9.6 | 14.2 | 15.8 | Broke |

The results in the Table show that the resistance of the spandex of this invention to yellowing and to mechanical degradation was significantly and synergistically improved when compared to spandex outside of the invention without the stabilizing composition or only one of the two ingredients of the stabilizing composition.

What is claimed is:

1. Spandex containing a stabilizing composition consisting essentially of
   (A) 0.5–5% by weight of the spandex of poly(N,N-diethyl-2-aminoethyl methacrylate); and
   (B) 1.5–5% by weight of the spandex of an inorganic material selected from the group consisting of zinc oxide and a mixture of huntite and hydromagnesite.

2. The spandex of claim 1 wherein the inorganic material is a mixture of huntite and hydromagnesite.

* * * * *